(12) United States Patent
Taniyama et al.

(10) Patent No.: US 12,486,384 B2
(45) Date of Patent: Dec. 2, 2025

(54) LATEX COMPOSITION AND DIP-MOLDED BODY

(71) Applicant: ZEON CORPORATION, Tokyo (JP)

(72) Inventors: Tomoya Taniyama, Tokyo (JP);
Kentaro Hayasaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 673 days.

(21) Appl. No.: 17/796,041

(22) PCT Filed: Feb. 15, 2021

(86) PCT No.: PCT/JP2021/005463
§ 371 (c)(1),
(2) Date: Jul. 28, 2022

(87) PCT Pub. No.: WO2021/166835
PCT Pub. Date: Aug. 26, 2021

(65) Prior Publication Data
US 2023/0086263 A1    Mar. 23, 2023

(30) Foreign Application Priority Data
Feb. 18, 2020    (JP) ................................. 2020-025425

(51) Int. Cl.
*C08L 9/04*    (2006.01)

(52) U.S. Cl.
CPC ...................................... *C08L 9/04* (2013.01)

(58) Field of Classification Search
CPC ......... C08L 9/04; C08L 33/12; C08J 2313/02; C08J 2333/12; C08J 2433/12
USPC ....................................................... 524/501
See application file for complete search history.

(56) References Cited

U.S. PATENT DOCUMENTS

| 2014/0302265 A1* | 10/2014 | Yang .......................... C08L 9/04 |
| | | 524/521 |
| 2016/0272794 A1 | 9/2016 | Han et al. |
| 2020/0031100 A1 | 1/2020 | Hayasaka et al. |

FOREIGN PATENT DOCUMENTS

| CN | 103930479 A | 7/2014 |
| KR | 10-2013-0055334 A | 5/2013 |
| KR | 10-1495392 B1 | 2/2015 |
| WO | 2018/061868 A1 | 4/2018 |

OTHER PUBLICATIONS

Feb. 23, 2024 extended Search Report issued in European Patent Application No. 21757403.7.
Aug. 23, 2022 International Preliminary Report on Patentability issued in Patent Application No. PCT/JP2021/005463.
May 11, 2021 International Search Report issued in Patent Application No. PCT/JP2021/005463.

* cited by examiner

*Primary Examiner* — Marc S Zimmer
*Assistant Examiner* — Ronald Grinsted
(74) *Attorney, Agent, or Firm* — Oliff PLC

(57) ABSTRACT

A latex composition includes a latex of a conjugated diene polymer (A) having a glass transition temperature of 10° C. or less and a latex of a polymer (B) having a glass transition temperature of more than 10° C., wherein the value of (CS(B)−CS(A)) is more than 0% by weight, where a chemical stability of the latex of the conjugated diene polymer (A) to $CaCl_2$, when the solids concentration of the latex is 20% by weight, is defined as CS(A) (% by weight), and a chemical stability of the latex of the polymer (B) to $CaCl_2$, when the solids concentration of the latex is 20% by weight, is defined as CS(B) (% by weight).

11 Claims, 1 Drawing Sheet

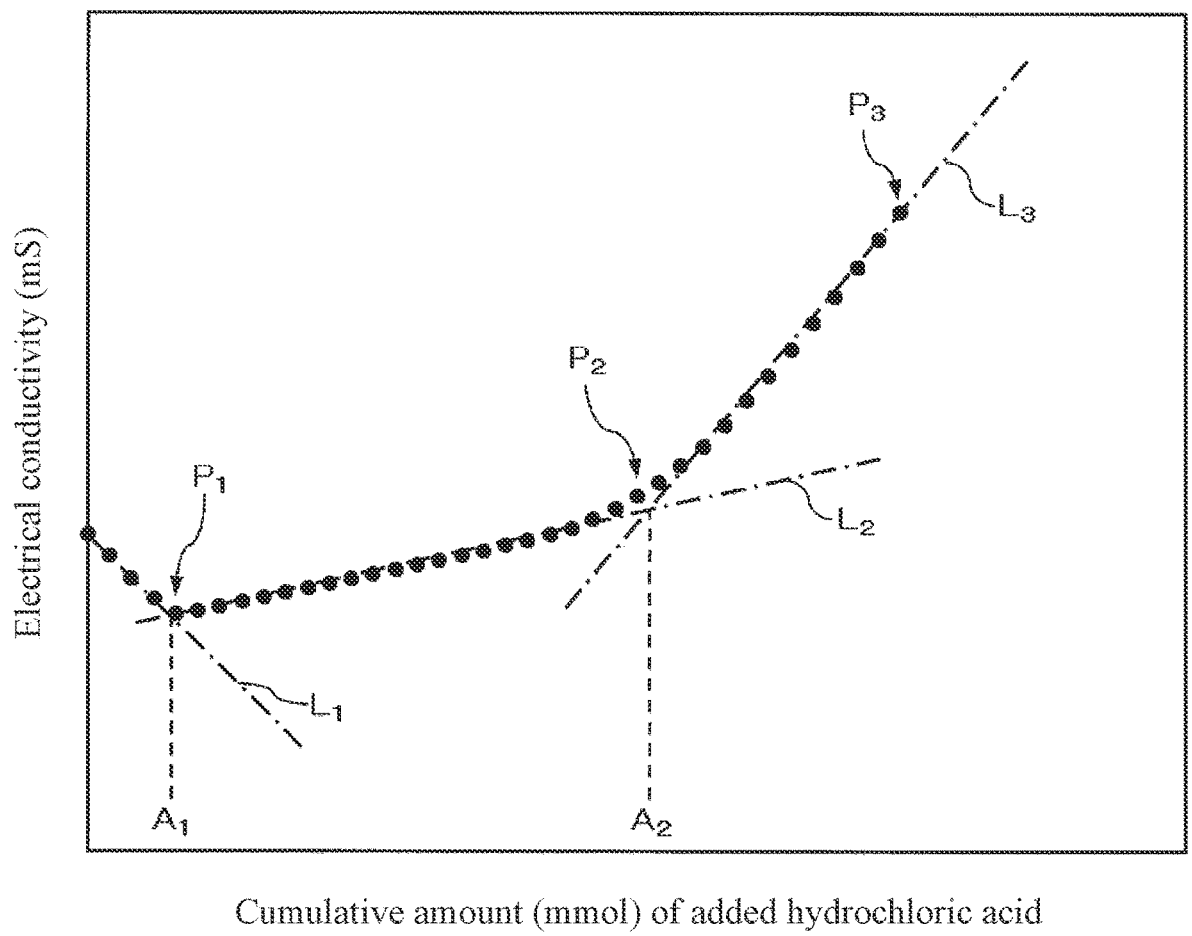

LATEX COMPOSITION AND DIP-MOLDED BODY

TECHNICAL FIELD

The present invention relates to a latex composition, and more specifically relates to a latex composition which can provide a dip-molded body having excellent oil grip properties.

BACKGROUND ART

Traditionally, protective gloves having solvent resistance, grip properties, wear resistance, and the like improved by coating fiber gloves with rubber or resin are used in a variety of applications such as manufacturing work in factories, light work, construction work, and farm work.

Such protective gloves are usually in contact with human bodies when used. Thus, the protective gloves are required to have excellent oil grip properties as well as high mechanical strength, such as wear resistance, and high durability.

For example, Patent Document 1 discloses a method of producing a laminate, the method comprising a coagulant solution applying step of applying a coagulant solution to a fibrous substrate, and a coagulating step of forming a polymer layer on the fibrous substrate by bringing a polymer latex into contact with the fibrous substrate having the coagulant solution applied thereto to coagulate the polymer, wherein the coagulant solution contains 0.2 to 7.0% by weight of a metal salt as a coagulant and 0.1 to 7.0% by weight of an organic acid dissolved or dispersed in the solvent.

RELATED ART DOCUMENTS

Patent Document

Patent Document 1: International Publication No. WO 2018/061868

SUMMARY OF THE INVENTION

Problem to be Solved by the Invention

Although the technique disclosed in Patent Document 1 provides a laminate which has high flexibility and high wear resistance and is suitably used in applications to protective gloves, it is still susceptible to improvement in grip performance of protective gloves wet with oil (i.e., oil grip properties). Accordingly, a further improvement is required to provide protective gloves which can be suitably used even in applications in use in contact with oil.

The present invention has been made in consideration of such circumstances, and an object of the present invention is to provide a latex composition which can provide a dip-molded body having excellent oil grip properties. Another object of the present invention is to provide a dip-molded body prepared from such a latex composition.

Means for Solving Problems

The present inventor, who has conducted extensive research to solve the above problems, has found that the problems can be solved by a latex composition comprising a latex of a conjugated diene polymer (A) having a glass transition temperature of 10° C. or less and a latex of a polymer (B) having a glass transition temperature of more than 10° C. in which a chemical stability CS(A) of the latex of the conjugated diene polymer (A) to $CaCl_2$ and a chemical stability CS(B) of the latex of the polymer (B) to $CaCl_2$ are controlled to have a specific relation, and has completed the present invention.

Specifically, the present invention provides a latex composition comprising a latex of a conjugated diene polymer (A) having a glass transition temperature of 10° C. or less and a latex of a polymer (B) having a glass transition temperature of more than 10° C., wherein the value of (CS(B)−CS(A)) is more than 0% by weight, where a chemical stability of the latex of the conjugated diene polymer (A) to $CaCl_2$, when the solids concentration of the latex is 20% by weight, is defined as CS(A) (% by weight), and a chemical stability of the latex of the polymer (B) to $CaCl_2$, when the solids concentration of the latex is 20% by weight, is defined as CS(B) (% by weight).

Preferably, polymer particles contained in the latex composition according to the present invention have a volume average particle size of 250 nm or less.

Preferably, the polymer particles contained in the latex composition according to the present invention have a volume average particle size of 200 nm or less.

In the latex composition according to the present invention, preferably, particles of the polymer (B) contained in the latex of the polymer (B) have a volume average particle size smaller than that of particles of the conjugated diene polymer (A) contained in the latex of the conjugated diene polymer (A).

In the latex composition according to the present invention, preferably, the particles of the polymer (B) contained in the latex of the polymer (B) have a volume average particle size of 200 nm or less.

In the latex composition according to the present invention, preferably, the particles of the polymer (B) contained in the latex of the polymer (B) have a volume average particle size of 100 nm or less.

In the latex composition according to the present invention, preferably, the latex composition has a solids concentration of 30% by weight or more.

In the latex composition according to the present invention, preferably, the polymer (B) has a polymer chain terminated with a sulfate group as a residue of a polymerization initiator.

In the latex composition according to the present invention, the polymer (B) is preferably a polymer containing styrene monomer units or (meth)acrylic acid ester monomer units, more preferably a polymer containing (meth)acrylic acid ester monomer units.

In the latex composition according to the present invention, preferably, the conjugated diene polymer (A) comprises at least one member selected from the group consisting of styrene-butadiene rubbers, nitrile rubbers, and polyisoprene rubbers.

In the latex composition according to the present invention, preferably, the conjugated diene polymer (A) is a carboxyl group-containing conjugated diene polymer.

In the latex composition according to the present invention, preferably, the conjugated diene polymer (A) and the polymer (B) are contained in a weight ratio of "conjugated diene polymer (A):polymer (B)" of 1:9 to 9:1.

Moreover, the present invention provides a dip-molded body prepared from the latex composition.

The dip-molded body according to the present invention is preferably a glove.

Effects of Invention

The present invention can provide a latex composition which can provide a dip-molded body having excellent oil grip properties, and a dip-molded body prepared from such a latex composition.

BRIEF DESCRIPTION OF DRAWING

FIG. 1 is a graph illustrating one example of a hydrochloric acid content-electrical conductivity curve obtained in measurement of an acid content of a water-soluble polymer.

DESCRIPTION OF EMBODIMENTS

<Latex Composition>

The latex composition according to the present invention is a latex composition comprising a latex of a conjugated diene polymer (A) having a glass transition temperature of 10° C. or less and a latex of a polymer (B) having a glass transition temperature of more than 10° C.,
  wherein the value of (CS(B)–CS(A)) is more than 0% by weight,
  where a chemical stability of the latex of the conjugated diene polymer (A) to $CaCl_2$, when the solids concentration of the latex is 20% by weight, is defined as CS(A) (% by weight), and
  a chemical stability of the latex of the polymer (B) to $CaCl_2$, when the solids concentration of the latex is 20% by weight, is defined as CS(B) (% by weight).

The conjugated diene polymer (A) having a glass transition temperature of 10° C. or less (hereinafter, referred to as "conjugated diene polymer (A)" depending on cases) which constitutes the latex of the conjugated diene polymer (A) having a glass transition temperature of 10° C. or less (hereinafter, referred to as "latex of conjugated diene polymer (A)" depending on cases) can be any polymer having units derived from a conjugated diene monomer. Examples of the conjugated diene polymer (A) include, but should not be limited to, nitrile rubber (NBR), natural rubber (NR), styrene-butadiene rubber (SBR), synthetic polyisoprene rubber (IR), polybutadiene rubber (BR), styrene-isoprene copolymer rubber, styrene-isoprene-styrene copolymer rubber, and the like. To more remarkably demonstrate the effects of the present invention, among these, preferred are synthetic rubbers, more preferred are nitrile rubber (NBR), styrene-butadiene rubber (SBR), and synthetic polyisoprene rubber (IR), and still more preferred are conjugated diene polymers containing a nitrile group (hereinafter, referred to as "nitrile group-containing conjugated diene polymers" depending on cases), such as NBR. These conjugated diene polymers may be conjugated diene polymers containing a carboxyl group (hereinafter, referred to as "carboxyl group-containing conjugated diene polymers" depending on cases).

Although not particularly limited, for example, the nitrile group-containing conjugated diene polymers to be used can be those prepared by copolymerizing an α,β-ethylenically unsaturated nitrile monomer, a conjugated diene monomer, and a different copolymerizable ethylenically unsaturated acid monomer optionally used.

The α,β-ethylenically unsaturated nitrile monomer is not particularly limited, and an ethylenically unsaturated compound having a nitrile group and preferably 3 to 18 carbon atoms can be used. Examples of such an α,β-ethylenically unsaturated nitrile monomer include acrylonitrile, methacrylonitrile, halogen-substituted acrylonitrile, and the like. Among these, acrylonitrile is particularly preferred. These α,β-ethylenically unsaturated nitrile monomers may be used alone or in combination.

The content of α,β-ethylenically unsaturated nitrile monomer units contained in the nitrile group-containing conjugated diene polymer is preferably 10 to 45% by weight, more preferably 20 to 40% by weight, still more preferably 25 to 40% by weight in the total monomer units. Control of the content of the α,β-ethylenically unsaturated nitrile monomer units within these ranges results in a dip-molded body having high solvent resistance.

As the conjugated diene monomer, preferred are $C_4$ to $C_6$ conjugated diene monomers such as 1,3-butadiene, isoprene, 2,3-dimethyl-1,3-butadiene, 1,3-pentadiene, and chloroprene, more preferred are 1,3-butadiene and isoprene, and particularly preferred is 1,3-butadiene. These conjugated diene monomers may be used alone or in combination.

The content of conjugated diene monomer units in the nitrile group-containing conjugated diene polymer is preferably 40 to 80% by weight, more preferably 52 to 78% by weight, still more preferably 55 to 75% by weight in the total monomer units. Control of the content of the conjugated diene monomer units within these ranges results in a dip-molded body having high flexibility.

The nitrile group-containing conjugated diene polymer may also be a copolymer prepared by copolymerizing a monomer forming α,β-ethylenically unsaturated nitrile monomer units, a monomer forming conjugated diene monomer units, and a different copolymerizable ethylenically unsaturated acid monomer.

Examples of such a different copolymerizable ethylenically unsaturated acid monomer include, but should not be limited to, carboxyl group-containing ethylenically unsaturated monomers, monocarboxylic acid ester group-containing ethylenically unsaturated monomers, dicarboxylic acid diester group-containing ethylenically unsaturated monomers, sulfonic acid group-containing ethylenically unsaturated monomers, phosphoric acid group-containing ethylenically unsaturated monomers, and the like. Among these, preferred are carboxyl group-containing ethylenically unsaturated monomers and dicarboxylic acid diester group-containing ethylenically unsaturated monomers, because the resulting nitrile group-containing conjugated diene polymer can have a carboxyl group, which results in a dip-molded body having higher tensile strength and wear resistance.

Examples of the carboxyl group-containing ethylenically unsaturated monomers include, but should not be limited to, ethylenically unsaturated monocarboxylic acids such as acrylic acid, methacrylic acid, and crotonic acid; ethylenically unsaturated polyvalent carboxylic acids and anhydrides thereof, such as fumaric acid, maleic acid, itaconic acid, maleic anhydride, and itaconic anhydride; partially esterified products of ethylenically unsaturated polyvalent carboxylic acids such as methyl maleate and methyl itaconate; and the like.

Examples of the monocarboxylic acid ester group-containing ethylenically unsaturated monomers include, but should not be limited to, acrylic acid esters such as methyl acrylate; methacrylic acid esters such as methyl methacrylate; crotonic acid esters such as methyl crotonate; and the like.

Examples of the dicarboxylic acid diester group-containing ethylenically unsaturated monomers include, but should not be limited to, maleic acid diesters such as dimethyl maleate; itaconic acid diesters such as methyl itaconate; and the like.

Examples of the sulfonic acid group-containing ethylenically unsaturated monomers include, but should not be limited to, vinylsulfonic acid, methylvinylsulfonic acid, styrenesulfonic acid, (meth)allylsulfonic acid, ethyl (meth)acrylate-2-sulfonate, 2-acrylamide-2-hydroxypropanesulfonic acid, and the like.

Examples of the phosphoric acid group-containing ethylenically unsaturated monomers include, but should not be limited to, propyl (meth)acrylate-3-chloro-2-phosphate, ethyl(meth)acrylate-2-phosphate, 3-allyloxy-2-hydroxypropane phosphoric acid, and the like.

These different copolymerizable ethylenically unsaturated acid monomers can also be used in the form of alkali metal salts or ammonium salts, and may be used alone or in combination. Among these different copolymerizable ethylenically unsaturated acid monomers listed above, preferred are carboxyl group-containing ethylenically unsaturated monomers, more preferred are ethylenically unsaturated monocarboxylic acids, still more preferred are acrylic acid and methacrylic acid, and particularly preferred is methacrylic acid.

When the nitrile group-containing conjugated diene polymer contains units of a different copolymerizable ethylenically unsaturated acid monomer, the content of the units of the different copolymerizable ethylenically unsaturated acid monomer is preferably 0.1 to 15% by weight, more preferably 1 to 10% by weight, still more preferably 2 to 8% by weight in the total monomer units.

A latex of a nitrile group-containing conjugated diene polymer can be prepared through emulsion polymerization of a monomer mixture containing the above-mentioned monomers, for example. In emulsion polymerization, polymerization additives usually used, such as an emulsifier, a polymerization initiator, and a molecular weight modifier, can be used.

Examples of the emulsifier used in emulsion polymerization include, but should not be limited to, anionic surfactants, nonionic surfactants, cationic surfactants, amphoteric surfactants, and the like. Preferred are anionic surfactants. Specific examples of the anionic surfactants include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkylsulfosuccinic acid salts such as sodium di(2-ethylhexyl) sulfosuccinate, potassium di(2-ethylhexyl)sulfosuccinate, and sodium dioctylsulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; monoalkyl phosphoric acid salts such as sodium lauryl phosphate and potassium lauryl phosphate; sodium salts of condensation products of 3, -naphthalene sulfonic acid and formalin; and the like.

The amount of the emulsifier to be used in emulsion polymerization is preferably 0.5 to 10 parts by weight, more preferably 1 to 8 parts by weight relative to 100 parts by weight of the total monomers used.

Although not particularly limited, preferred polymerization initiators are radical initiators. Examples of the radical initiators include, but should not be limited to, inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. Among these, preferred are inorganic peroxides or organic peroxides, more preferred are inorganic peroxides, and particularly preferred are persulfate salts. These polymerization initiators may be used alone or in combination.

The amount of the polymerization initiator to be used is preferably 0.01 to 2 parts by weight, more preferably 0.05 to 1.5 parts by weight relative to 100 parts by weight of the total monomers used.

When the peroxide is used as the polymerization initiator, it may be used as a redox polymerization initiator in combination with a reducing agent. Examples of the reducing agent include, but should not be limited to, compounds containing metal ions in reduced states, such as ferrous sulfate and cuprous naphthenate; sulfonic acid compounds such as sodium methanesulfonate; amine compounds such as dimethylaniline; carboxylic acid compounds such as sodium ethylenediaminetetraacetate; and the like. These reducing agents can be used alone or in combination. The amount of the reducing agent to be used is preferably 3 to 1000 parts by weight relative to 100 parts by weight of the peroxide.

Examples of the molecular weight modifier include, but should not be limited to, α-methylstyrene dimers; mercaptans such as t-dodecylmercaptan, n-dodecylmercaptan, and octylmercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropylxanthogen disulfide; and the like. Among these, preferred are mercaptans, and more preferred is t-dodecylmercaptan. These molecular weight modifiers may be used alone or in combination.

Although it depends on the type, the amount of the molecular weight modifier to be used is preferably 0.1 to 1.5 parts by weight, more preferably 0.2 to 1.0 part by weight relative to 100 parts by weight of the total monomers used.

Emulsion polymerization is usually performed in water. The amount of water to be used is preferably 80 to 500 parts by weight, more preferably 100 to 200 parts by weight relative to 100 parts by weight of the total monomers used.

In the emulsion polymerization, polymerization additives other than those listed above may be further used as needed. Examples of the polymerization additives include chelating agents, dispersants, pH adjusters, deoxidizers, particle size adjusters, and the like. Any type thereof can be used in any amount.

Examples of a method of adding monomers include a method of adding monomers for use in batch to a reaction vessel; a method of continuously or intermittently adding the monomers as progression of polymerization; a method of adding part of the monomers to react the monomers to a specific conversion ratio, and then continuously or intermittently adding the remaining monomers to polymerize the monomers; and the like. Any one of the methods may be used. When the monomers are mixed and continuously or intermittently added, the composition of the mixture may be fixed or varied.

Alternatively, the monomers to be used may be added to a reaction vessel in the form of a premix, or may be separately added to a reaction vessel.

Although not particularly limited, the polymerization temperature during emulsion polymerization is usually 0 to 95° C., preferably 5 to 70° C. Although not particularly limited, the polymerization time is usually about 5 to 40 hours.

After the polymerization reaction is terminated, as needed, unreacted monomers may be removed, and the solids concentration and the pH may be adjusted.

The conjugated diene polymer (A) which constitutes the latex of the conjugated diene polymer (A) has a glass transition temperature of 10° C. or less, preferably −45 to −10° C., more preferably −40 to −10° C., particularly preferably −35° C. to −15° C. A significantly high glass transition temperature of the conjugated diene polymer (A) results in a dip-molded body having reduced oil grip properties. Examples of a method of controlling the glass transition temperature of the conjugated diene polymer (A) to the above ranges include, but should not be limited to, a method of controlling the contents of units of the monomers constituting the conjugated diene polymer (A) to the ranges specified above, and the like.

For the latex of the conjugated diene polymer (A), it is sufficient that the chemical stability (CS(A)) thereof to $CaCl_2$ satisfies a value of (CS(B)−CS(A)) of more than 0% by weight in relation to the chemical stability (CS(B)) of the latex of the polymer (B) to $CaCl_2$ as described later. The chemical stability (CS(A)) of the latex of the conjugated diene polymer (A) to $CaCl_2$ is preferably more than 0% by weight and 0.5% by weight or less, more preferably 0.001 to 0.25% by weight, still more preferably 0.005 to 0.1% by weight. By controlling the chemical stability (CS(A)) of the latex of the conjugated diene polymer (A) to $CaCl_2$ within the above ranges, the resulting dip-molded body can have further enhanced oil grip properties.

In the present invention, the chemical stability (CS(A)) of the latex of the conjugated diene polymer (A) to $CaCl_2$ can be measured, as below, as a chemical stability of the latex of the conjugated diene polymer (A) to $CaCl_2$ when the solids concentration of the latex is 20% by weight. Initially, the latex of the conjugated diene polymer (A) is diluted with distilled water to prepare a diluted latex of the conjugated diene polymer (A) having a solids concentration of 20% by weight. About five to ten aqueous solutions of $CaCl_2$ having different concentrations (% by weight) ranging from 0.01 to 5% by weight are prepared. Here, when the $CaCl_2$ concentration is varied, the chemical stability tends to change more significantly in a lower $CaCl_2$ concentration, and to change more slightly in a higher $CaCl_2$ concentration. In other words, when the $CaCl_2$ concentration is relatively low such as 0.3% by weight or less, the chemical stability changes by varying the $CaCl_2$ concentration by about 0.1% by weight. In contrast, when the $CaCl_2$ concentration is relatively high such as more than 0.3% by weight, the change in chemical stability can be sufficiently observed by varying the $CaCl_2$ concentration with an interval of 0.2 to 0.25% by weight. In preparation of the $CaCl_2$ aqueous solutions, this tendency should be considered, and about five to ten aqueous solutions of $CaCl_2$ are prepared while the interval of the $CaCl_2$ concentration is smaller in the lower ranges of the $CaCl_2$ concentration and is larger in the higher ranges of the $CaCl_2$ concentration. In the next step, each of the resulting $CaCl_2$ aqueous solutions having different concentrations is placed into a dish in an amount of 6 to 7 g, and 0.03 to 0.04 g of the diluted latex of the conjugated diene polymer (A) is added dropwise thereto. After the addition, the dishes are left to stand for 1 minute, and then the $CaCl_2$ aqueous solution and the diluted latex therein are mixed by lightly shaking the dishes. After the mixing, formation of aggregates is visually checked. Among the $CaCl_2$ concentrations of the $CaCl_2$ aqueous solutions in which aggregates are not formed after the addition of the diluted latex of the conjugated diene polymer (A), the highest $CaCl_2$ concentration is defined as the chemical stability (CS(A)) of the latex of the conjugated diene polymer (A).

Particles of the conjugated diene polymer (A) constituting the latex of the conjugated diene polymer (A) have a volume average particle size of preferably 30 to 1000 nm, more preferably 50 to 500 nm, still more preferably 70 to 200 nm, particularly preferably 90 to 150 nm. By controlling the volume average particle size of the particles of the conjugated diene polymer (A) within the above ranges, the polymer (B) having a glass transition temperature of more than 10° C. can be more favorably finely dispersed in the conjugated diene polymer (A) in the resulting dip-molded body, thereby enhancing the wear resistance. The volume average particle size of the particles of the conjugated diene polymer (A) constituting the latex of the conjugated diene polymer (A) can be measured using a light scattering diffraction particle analyzer, for example.

Although not particularly limited, the tetrahydrofuran-insoluble fraction of the polymer (A) is preferably 20 to 80% by weight, more preferably 30 to 70% by weight, still more preferably 40 to 60% by weight. The tetrahydrofuran-insoluble fraction of the polymer (A) is an index indicating the gel content of the polymer (A).

Examples of a method of measuring the tetrahydrofuran-insoluble fraction of the polymer (A) include the following method. In other words, first, a latex of the polymer (A) is applied onto a substrate by casting or the like, and is dried to form a dried film. The weight of the dried film is measured. In the next step, the dried film is immersed in tetrahydrofuran under a condition at 25° C. for 24 hours. Subsequently, the film after the immersion is dried at 105° C. for 3 hours to remove tetrahydrofuran. The weight of the film after the removal of tetrahydrofuran is measured. The tetrahydrofuran-insoluble fraction can be determined from these results in the measurement of the weights.

The polymer (B) having a glass transition temperature of more than 10° C. (hereinafter, referred to as "polymer (B)" depending on cases), which constitutes the latex of the polymer (B) having a glass transition temperature of more than 10° C. (hereinafter, referred to as "latex of the polymer (B)" depending on cases) is not particularly limited as long as it has a glass transition temperature of more than 10° C. and a latex thereof has a chemical stability to $CaCl_2$ higher than that of the latex of the conjugated diene polymer (A). In other words, it is sufficient that the polymer (B) has a glass transition temperature of more than 10° C. and that the chemical stability CS(B) of the latex of the polymer (B) satisfies a value of (CS(B)−CS(A)) of more than 0% by weight in relation to the above-described chemical stability CS(A) of the latex of the conjugated diene polymer (A) to $CaCl_2$; where the chemical stability of the latex of the polymer (B) to $CaCl_2$, when the solids concentration of the latex is 20% by weight, is defined as CS(B) (% by weight).

The chemical stability CS(B) (% by weight) of the latex of the polymer (B) to $CaCl_2$, when the solids concentration of the latex is 20% by weight, can be measured by the same method described above of measuring the chemical stability (CS(A)) of the latex of the conjugated diene polymer (A) to $CaCl_2$, as the chemical stability of the latex of the polymer (B) to $CaCl_2$ when the solids concentration of the latex is 20% by weight.

Examples of such a polymer (B) include, but should not be limited to, acrylic resins, PTFE resins, acrylonitrile-styrene (AS) resins, polyurethane, and the like. Among these, preferred are acrylic resins because of their high effect of improving the oil grip properties. These polymers may be used alone or in combination. When a combination of two or more polymers is used as the polymer (B), it is sufficient that the chemical stability (CS(B)) of a latex containing the combination to $CaCl_2$ satisfies a value of (CS(B)−CS(A)) of more than 0% by weight in relation to the chemical stability (CS(A)) of the latex of the conjugated diene polymer (A) to $CaCl_2$. As one example, even when a polymer (B) comprises a combination of a first polymer and a second polymer where (CS(B)−CS(A))>0% by weight is satisfied in a latex containing the first polymer alone and (CS(B)−CS(A)) 0% by weight is satisfied in a latex containing the second polymer alone, it is sufficient that (CS(B)−CS(A))>0% by weight is satisfied in a latex containing both the first polymer and the second polymer. For example, when the polymer (B) is a combination of an acrylic resin with a polymer other than the acrylic resin, examples of the polymer used in combination with an acrylic resin include polystyrene resins, PTFE resins, acrylonitrile-styrene (AS) resins, polyurethane, and the like. The acrylic resin and the polymer other than the acrylic resin are contained in a weight ratio of "acrylic resin:polymer other than acrylic resin" of preferably 1:9 to 9:1, more preferably 3:7 to 7:3.

Examples of acrylic resins include homopolymers of acrylic acid esters, methacrylic acid esters, acrylic acid, or methacrylic acid, copolymers of acrylic acid esters with acrylic acid, copolymers of acrylic acid esters with methacrylic acid, copolymers of methacrylic acid esters with acrylic acid, copolymers of methacrylic acid esters with methacrylic acid, copolymers of acrylic acid esters, methacrylic acid esters, and acrylic acid, copolymers of acrylic acid esters, methacrylic acid esters, and methacrylic acid, and copolymers of acrylic acid esters, methacrylic acid esters, acrylic acid, and methacrylic acid. Among these, homopolymers of acrylic acid esters, methacrylic acid esters, acrylic acid, or methacrylic acid are preferably used, and homopolymers of methacrylic acid esters are preferably used.

Examples of the acrylic acid esters used to form acrylic resins include methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, sec-pentyl acrylate, isopentyl acrylate, neopentyl acrylate, n-hexyl acrylate, isohexyl acrylate, neohexyl acrylate, sec-hexyl acrylate, tert-hexyl acrylate, and the like. Among these, preferred are methyl acrylate, ethyl acrylate, n-propyl acrylate, isopropyl acrylate, and n-butyl acrylate, and more preferred is methyl acrylate.

Examples of the methacrylic acid esters used to form acrylic resins include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, sec-pentyl methacrylate, isopentyl methacrylate, neopentyl methacrylate, n-hexyl methacrylate, isohexyl methacrylate, neohexyl methacrylate, sec-hexyl methacrylate, tert-hexyl methacrylate, and the like. Among these, preferred are methyl methacrylate, n-propyl methacrylate, isopropyl methacrylate, and n-butyl methacrylate, more preferred is methyl methacrylate, and particularly preferred is a homopolymer of methyl methacrylate (poly(methyl methacrylate)).

The acrylic resin as the polymer (B) may be a product prepared by copolymerizing an acrylic acid ester monomer, a methacrylic acid ester monomer, an acrylic acid monomer, or a methacrylic acid monomer with a different copolymerizable monomer.

Examples of the different copolymerizable monomer include α-olefin monomers such as ethylene, propylene, 1-butene, 4-methyl-1-pentene, 1-hexene, and 1-octene; aromatic monomers such as styrene, α-methylstyrene, and vinylpyridine; α,β-ethylenically unsaturated polyvalent carboxylic acids such as maleic acid, fumaric acid, and itaconic acid; α,β-ethylenically unsaturated polyvalent carboxylic acid monoesters such as monomethyl maleate, monoethyl maleate, and monoethyl itaconate; α,β-ethylenically unsaturated polyvalent carboxylic acid polyvalent esters such as dimethyl maleate, di-n-butyl fumarate, dimethyl itaconate, and di-2-ethylhexyl itaconate; vinyl ester monomers such as vinyl acetate and vinyl propionate; α,β-ethylenically unsaturated monocarboxylic acid amides such as acrylamide and methacrylamide; N-substituted maleimides; vinyl ether monomers such as vinyl methyl ether, vinyl ethyl ether, and vinyl cetyl ether; vinylidene compounds such as vinylidene chloride; and the like. Among these, preferred are aromatic monomers, and more preferred is styrene. The content of units of the different copolymerizable monomer is preferably 1 to 99% by weight, more preferably 5 to 95% by weight.

The method of preparing a latex of an acrylic resin as the polymer (B) may be a method of enabling polymerization of the above monomer(s). Examples thereof include known emulsion polymerization, seeded emulsion polymerization, fine suspension polymerization methods by radical polymerization, and the like.

The polymer (B) is preferably prepared in the presence of a persulfuric acid salt such as sodium persulfate, potassium persulfate, or ammonium persulfate as a polymerization initiator. Use of a persulfuric acid salt as a polymerization initiator results in a polymer (B) having a polymer chain terminated with a sulfate group as a residue of the polymerization initiator. Thus, the latex of the polymer (B) can have further enhanced chemical stability.

Although not particularly limited, the acrylic resin as the polymer (B) has a weight average molecular weight (Mw) of preferably 10,000 to 10,000,000, more preferably 10,000 to 5,000,000.

The polymer (B) constituting the latex of the polymer (B) has a glass transition temperature of more than 10° C., preferably 30° C. or more, more preferably 70° C. or more, still more preferably 95° C. or more, particularly preferably 105° C. or more. Although not particularly limited, the upper limit of the glass transition temperature of the polymer (B) is preferably 200° C. or less, more preferably 150° C. or less.

In the latex composition according to the present invention, the difference (CS(B)−CS(A)) between the chemical stability (CS(B)) of the latex of the polymer (B) to $CaCl_2$ and the chemical stability (CS(A)) of the latex of the conjugated diene polymer (A) to $CaCl_2$ is more than 0% by weight, preferably 0.1 to 40.0% by weight, more preferably 0.3 to 40.0% by weight, still more preferably 0.5 to 5% by weight, particularly preferably 0.7 to 2% by weight. A significantly small difference (CS(B)−CS(A)) between these chemical stabilities results in a dip-molded body having reduced oil grip properties.

For the latex of the polymer (B), it is sufficient that the chemical stability (CS(B)) thereof to $CaCl_2$ satisfies a difference (CS(B)−CS(A)) within the above ranges in relation to the chemical stability (CS(A)) of the latex of the conjugated diene polymer (A) to $CaCl_2$. Although not particularly limited, the chemical stability (CS(B)) of the latex of the polymer (B) to CaCl$_2$ is preferably 0.1 to 40.0% by weight, more preferably 0.2 to 40.0% by weight, still more preferably 0.3 to 40.0% by weight, further still more preferably 0.5 to 5% by weight, particularly preferably 0.7 to 2% by weight. By controlling the chemical stability (CS(B)) of the latex of the polymer (B) to CaCl$_2$ within the above ranges, the resulting dip-molded body can have further enhanced oil grip properties.

The latex composition according to the present invention is preferably prepared by mixing the latex of the conjugated diene polymer (A) having a glass transition temperature of 10° C. or less and the latex of the polymer (B) having a glass transition temperature of more than 10° C. in latex states. When such a latex composition prepared by mixing the latex of the conjugated diene polymer (A) and the latex of the polymer (B) in latex states is used for production of a dip-molded body, dripping during formation of the dip-molded body can be further suppressed, and the resulting dip-molded body can have further enhanced oil grip properties.

In particular, by mixing the latex of the conjugated diene polymer (A) and the latex of the polymer (B) in latex states, particles of the conjugated diene polymer (A) and particles of the polymer (B) can be homogeneously finely dispersed in the latex composition. In production of the dip-molded body by dip molding, these can be co-deposited in the resulting dip-molded body while the polymer (B) is finely dispersed in the matrix of the conjugated diene polymer W. As a result, the oil grip properties of the resulting dip-molded body can be further enhanced due to action of the finely dispersed polymer (B). Although in the present invention, the latex composition is preferably prepared by mixing the latex of the conjugated diene polymer (A) and the latex of the polymer (B) in latex states, it is sufficient that the latex composition according to the present invention is a dispersion of particles of the conjugated diene polymer (A) and particles of the polymer (B) in an aqueous medium, and the latex composition according to the present invention is not particularly limited to a product prepared by mixing these latices.

If the polymer (B) constituting the latex of the polymer (B) has a significantly low glass transition temperature, the resulting dip-molded body has reduced oil grip properties. The glass transition temperature of the polymer (B) can be controlled within the above ranges by any method. For example, when a latex of a vinyl chloride resin is used as the latex of the polymer (B), examples of the method of controlling the glass transition temperature of the polymer (B) within the above ranges include a method of controlling the content of vinyl chloride monomer units in the vinyl chloride resin to preferably 50% by weight or more, more preferably 75% by weight or more; and the like.

To further enhance the oil grip properties of the resulting dip-molded body, the volume average particle size of the particles of the polymer (B) which constitutes the latex of the polymer (B) is preferably smaller than that of the particles of the conjugated diene polymer (A) which constitutes the latex of the conjugated diene polymer (A).

The particles of the polymer (B) which constitutes the latex of the polymer (B) have a volume average particle size of preferably 1 to 200 nm, more preferably 5 to 160 nm, still more preferably 5 to 120 nm, further still more preferably 10 to 100 nm, particularly preferably 20 to 80 nm. By controlling the volume average particle size of the particles of the polymer (B) within the above ranges, the polymer (B) can be more favorably finely dispersed in the conjugated diene polymer (A) in the resulting dip-molded body. This can enhance the wear resistance. The volume average particle size of the particles of the polymer (B) which constitutes the latex of the polymer (B) can be measured using a light scattering diffraction particle analyzer (available from Beckman Coulter, Inc., trade name "LS-230"), for example.

Although not particularly limited, the tetrahydrofuran-insoluble fraction of the polymer (B) is preferably 5 to 60% by weight, more preferably 10 to 50% by weight, still more preferably 20 to 40% by weight. The tetrahydrofuran-insoluble fraction of the polymer (B) is an index indicating the gel content of the polymer (B). When the tetrahydrofuran-insoluble fraction of the polymer (B) falls within these ranges, the resulting latex composition can have further enhanced chemical stability, which results in a dip-molded body having further enhanced oil grip properties. The tetrahydrofuran-insoluble fraction of the polymer (B) can be measured by the same method as in the measurement of the tetrahydrofuran-insoluble fraction of the polymer (A).

The content of the conjugated diene polymer (A) and the content of the polymer (B) in the latex composition according to the present invention are not particularly limited. The content of the conjugated diene polymer (A) relative to 100 parts by weight of polymer components contained in the latex composition (100 parts by weight of the total amount of the conjugated diene polymer (A) and the polymer (B) if the polymer components include only the conjugated diene polymer (A) and the polymer (B)) is preferably 40 parts by weight or more, more preferably 40 to 95 parts by weight, still more preferably 40 to 80 parts by weight. The content of the polymer (B) relative to 100 parts by weight of the polymer components contained in the latex composition is preferably 5 to 80 parts by weight, more preferably 10 to 70 parts by weight, still more preferably 20 to 60 parts by weight. Furthermore, the conjugated diene polymer (A) and the polymer (B) are contained in the latex composition according to the present invention in a weight ratio of "conjugated diene polymer (A):polymer (B)" of preferably 99:1 to 1:99, more preferably 90:10 to 10:90, still more preferably 80:20 to 20:80, particularly preferably 75:25 to 25:75. Control of the contents of the conjugated diene polymer (A) and the polymer (B) within the ranges above results in a dip-molded body having further enhanced oil grip properties.

Moreover, the latex composition according to the present invention may further contain a water-soluble polymer.

Examples of the water-soluble polymer include vinyl compounds such as poly(vinyl alcohol) and polyvinylpyrrolidone; cellulose derivatives, such as hydroxyethyl cellulose, hydroxypropyl cellulose, and carboxymethyl cellulose, and salts thereof; polycarboxylic compounds, such as polyacrylic acid, and sodium salts thereof; polyoxyethylene derivatives such as polyethylene glycol ether; and the like. Preferred water-soluble polymers are cellulose derivatives and salts thereof. More preferred are carboxymethyl cellulose and sodium salts thereof. The content of the water-soluble polymer is preferably 0.01 to 10 parts by weight, more preferably 0.1 to 5 parts by weight relative to 100 parts by weight of the polymer components contained in a first latex composition.

Although not particularly limited, the acid content of the water-soluble polymer is preferably 10 mmol/g or less. In other words, the first latex composition used in the present invention preferably contains a water-soluble polymer having an acid content of 10 mmol/g or less.

When the latex composition according to the present invention contains a water-soluble polymer having an acid content of 10 mmol/g or less in addition to the latex of the conjugated diene polymer (A) and the latex of the polymer (B), the resulting dip-molded body can have further enhanced oil grip properties.

The acid content of the water-soluble polymer is preferably 10 mmol/g or less, more preferably 5 mmol/g or less, still more preferably 2.5 mmol/g or less. Although not particularly limited, the lower limit of the acid content of the water-soluble polymer is usually 0.001 mmol/g or more. When the acid content of the water-soluble polymer falls within the ranges above, the resulting dip-molded body has further enhanced oil grip properties.

Examples of the water-soluble polymer having an acid content of 10 mmol/g or less include, but should not be limited to, vinyl compounds such as poly(vinyl alcohol) and polyvinylpyrrolidone; carboxylic acid-modified vinyl compounds such as carboxylic acid-modified poly(vinyl alcohol) and carboxylic acid-modified polyvinylpyrrolidone; cellulose derivatives, such as hydroxyethyl cellulose, hydroxypropyl cellulose, and carboxymethyl cellulose, and salts thereof; polyoxyethylene derivatives such as polyethylene glycol ether; and the like. These water-soluble polymers may be used alone or in combination.

The acid content of the water-soluble polymer can be measured by the following method, for example.

Initially, 50 g of an aqueous solution of a water-soluble polymer having a solids concentration adjusted to 0.2 to 1% with distilled water (where the solids content of the water-soluble polymer in 50 g of the aqueous solution of the water-soluble polymer is defined as W (g)) is placed into a 200-ml glass vessel washed with distilled water, and the glass vessel is set on a solution conductivity meter (available from Kyoto Electronics Manufacturing Co., Ltd.: CM-117, type of the cell used: K-121) to stats stirring. In the next step, while stirring is continued, 0.1 N sodium hydroxide is added such that the pH of the aqueous solution reaches 12 or more. The electrical conductivity is measured after 6 minutes have passed, and the measured value is defined as the electrical conductivity at the start of the measurement. Thereafter, 0.5 ml of 0.1 N hydrochloric acid is added to this water-soluble polymer aqueous solution, and the electrical conductivity is measured after 30 seconds. Again, 0.5 ml of 0.1 N hydrochloric acid is added, and the electrical conductivity is measured after 30 seconds. Such an operation is repeated at an interval of 30 seconds until the electrical conductivity becomes two times or more higher than that at the start of the measurement. The data of the obtained electrical conductivity is then plotted on a graph where the ordinate represents the electrical conductivity (mS) and the abscissa represents the cumulative amount (mmol) of added hydrochloric acid, and a hydrochloric acid content-electrical conductivity curve is obtained as shown in FIG. 1, which has two inflection points. The X coordinates of the obtained two inflection points and the X coordinate at the end of addition of hydrochloric acid are defined as $P_1$, $P_2$, and $P_3$ in the ascending order. From the data within three zones, i.e., the data in the zone from zero in the X coordinate to $P_1$, that in the zone from $P_1$ to $P_2$, and that in the zone from $P_2$ to $P_3$, approximate straight lines $L_1$, $L_2$, and $L_3$ are determined by the method of least squares. The X coordinate of the point of intersection between $L_1$ and $L_2$ is defined as $A_1$ (mmol), and that of the point of intersection between $L_2$ and $L_3$ is defined as $A_2$ (mmol). The acid content per 1 g of the water-soluble polymer is determined from the following expression:

acid content per 1 g of water-soluble polymer=$(A_2-A_1)/W$ (mmol/g)

When two or more water-soluble polymers are used in combination, a water-soluble polymer mixture prepared by mixing the water-soluble polymers in the same ratio as that of the water-soluble polymers in the latex composition according to the present invention is measured by the same method as above, and the measured acid content of the water-soluble polymer mixture can be defined as the acid content of the water-soluble polymer.

Although not particularly limited, the viscosity of the water-soluble polymer in a 4% by weight aqueous solution thereof is preferably 1 mPa·s or more, more preferably 10 mPa·s or more, and preferably 20,000 mPa·s or less, more preferably 10,000 mPa·s or less. Although not particularly limited, the viscosity of the water-soluble polymer in a 1% by weight aqueous solution thereof is preferably 1 mPa·s or more, more preferably 10 mPa·s or more, and preferably 20,000 mPa·s or less, more preferably 10,000 mPa·s or less. The viscosity of the water-soluble polymer aqueous solution can be determined using a B type viscometer at 25° C. and a number of rotations of 6 rpm, for example.

Although the water-soluble polymer can be any polymer which is soluble in water and has any solubility to water, the solubility thereof to 100 g of water at a temperature of 25° C. is preferably 1 g or more, more preferably 7 g or more, particularly preferably 10 g or more. Although not particularly limited, the upper limit of the solubility of the water-soluble polymer to water is usually 1000000 g or less.

Although not particularly limited, the weight average molecular weight (Mw) of the water-soluble polymer is preferably 100 or more, more preferably 1,000 or more, and is preferably 5,000,000 or less, and more preferably 3,000,000 or less.

The compounding amount of the water-soluble polymer is preferably 0.01 to 10 parts by weight, more preferably 0.1 to 5 parts by weight, still more preferably 0.15 to 4.5 parts by weight relative to 100 parts by weight of the polymer components contained in the latex composition according to the present invention. When the compounding amount of the water-soluble polymer falls within these ranges, the resulting dip-molded body has further enhanced oil grip properties.

Polymer particles in the latex composition according to the present invention have a volume average particle size of preferably 30 to 250 nm, more preferably 30 to 200 nm, still more preferably 50 to 180 nm, particularly preferably 80 to 150 nm. By controlling of the volume average particle size of the polymer particles in the latex composition within the ranges above, the resulting latex composition can have further enhanced storage stability, and the resulting dip-molded body can have further enhanced oil grip properties. The volume average particle size of the polymer particles in the latex composition according to the present invention can be measured using a light scattering diffraction particle analyzer, for example.

The solids concentration of the latex composition according to the present invention is preferably 20 to 65% by weight, more preferably 30 to 60% by weight, still more preferably 35 to 55% by weight. By controlling the solids concentration of the latex composition within the ranges above, the resulting latex composition can have improved transport efficiency, and can have appropriate viscosity, which results in improved handling properties of the latex composition.

Examples of the method of controlling the solids concentration of the latex composition according to the present invention within the ranges above include a method of adjusting the solids concentrations of the components in the latex of the conjugated diene polymer (A) and the like, a method of adjusting the solids concentration by a concentration or dilution process described later, and the like. Among these, more preferred is the method of adjusting the solids concentration by a concentration process from the viewpoint of productivity.

The latex composition according to the present invention has a pH of preferably 5 to 13, more preferably 7 to 10, still more preferably 7.5 to 9. Control of the pH of the latex composition within the ranges above can improve the mechanical stability to suppress formation of coarse aggregates during transportation of the latex composition, and can provide appropriate viscosity of the latex composition to improve the handling properties thereof.

The latex composition according to the present invention may also contain a filler such as carbon black, silica, calcium carbonate, aluminum silicate, magnesium silicate, calcium silicate, magnesium oxide, zinc (meth)acrylate, magnesium (meth)acrylate, or titanium oxide. Moreover, the first latex composition used in the present invention may optionally contain predetermined amounts of a variety of additives other than the water-soluble salt and the filler, such as an anti-aging agent, an antioxidant, a preservative agent, an antibacterial agent, a wetting agent, a dispersant, a pigment, a dye, a reinforcing agent, a pH adjuster, and the like.

For example, the latex composition according to the present invention can be prepared by mixing the components described above, and optionally concentrating or diluting the mixture. The components can be mixed in any order. To further enhance the dispersibilities of the components, preferred is a method of preliminarily mixing the latex of the conjugated diene polymer (A) with the latex of the polymer (B), and then adding and mixing a thickener and components optionally compounded. The latex of the conjugated diene polymer (A) can be mixed with the latex of the polymer (B) by any method. To further enhance the dispersibility, preferred is a method (latex blending) of mixing the latex of the conjugated diene polymer (A) and the latex of the polymer (B) in latex states.

The latex composition according to the present invention is preferably prepared through a concentration process. Examples of the concentration process include, but should not be limited to, processes such as distillation under reduced pressure, distillation under normal pressure, centrifugation, and membrane concentration, and the like. Among these, preferred are concentration processes accompanied by heating, and more preferred is distillation under reduced pressure accompanied by heating. Use of a concentration process accompanied by heating can reduce bacteria which cause odor or suppress proliferation of such bacteria, resulting in a latex composition having lower odor.

In the concentration process accompanied by heating, the heating temperature is preferably 50° C. to 100° C. In the distillation under reduced pressure, the pressure is preferably 20 kPa to 90 kPa.

The concentration process may be performed on a mixture containing part of the components compounded in the latex composition, or may be performed on a mixture containing all the components compounded in the latex composition. From the viewpoint of the dispersibility and production efficiency of the latex composition, the concentration process is preferably performed on a mixture of the latex of the conjugated diene polymer (A) and the latex of the polymer (B).

In other words, a preferred method of preparing the latex composition according to the present invention is a method of preliminarily mixing the latex of the conjugated diene polymer (A) with the latex of the polymer (B), subjecting the mixture to a concentration process to increase the solids concentration, adding the components optionally compounded, followed by mixing to control the solids concentration within the ranges above.

<Dip-Molded Body>

The dip-molded body according to the present invention is a molded body prepared from the latex composition according to the present invention described above, and is usually formed by dip molding the latex composition according to the present invention described above.

Because the dip-molded body according to the present invention is a molded body prepared from the latex composition according to the present invention described above, the dip-molded body according to the present invention includes at least a polymer layer comprising the conjugated diene polymer (A) having a glass transition temperature of 10° C. or less and the polymer (B) having a glass transition temperature of more than 10° C. Suitable ranges of the content ratio of the conjugated diene polymer (A) to the polymer (B) in the dip-molded body according to the present invention are the same as the above-mentioned suitable ranges of the content ratio of the conjugated diene polymer (A) to the polymer (B) in the latex composition according to the present invention.

The dip-molded body according to the present invention may be a membrane molded body comprising a latex composition for dip molding and prepared by immersing a mold for dip molding in the latex composition for dip molding, such as the latex composition according to the present invention described above, or may be a laminate of a substrate and a polymer layer comprising the latex composition for dip molding, the laminate being prepared by immersing the substrate in the latex composition for dip molding. A case where the dip-molded body according to the present invention is a laminate of a substrate and a polymer layer comprising the latex composition for dip molding will be illustrated below, but such an embodiment should not be construed as limitations to the present invention.

Although any substrate can be used without limitation, a fibrous substrate can be suitably used when the dip-molded body according to the present invention is used as a protective glove. Any fibrous substrate can be used without limitation. For example, a glove-shaped product produced by weaving a twisted yarn of single fibers as fibers can be used. The fibrous substrate has an average thickness of preferably 50 to 3,000 μm, more preferably 100 to 2,000 μm.

For example, the dip-molded body according to the present invention can be prepared by immersing a substrate in the latex composition for dip molding to form a polymer layer comprising the latex composition for dip molding on the substrate. At this time, preferably, the substrate is immersed in the latex composition for dip molding in the state where the substrate is preliminarily put on a mold for molding having a desired shape.

Any mold for molding on which the substrate is put can be used without limitation, and molds made of a variety of materials, such as porcelain molds, glass molds, metal molds, plastic molds, and the like can be used. The mold for molding may have a desired shape according to the shape of the final product. For example, when the dip-molded body according to the present invention is used as a protective glove, molds for molding a variety of gloves, such as those having a shape including a wrist to finger tips, are preferably used as the mold for molding on which the substrate is put.

Prior to immersion of the substrate in the latex composition for dip molding, preferably, the substrate is immersed in a coagulant solution to apply the coagulant solution to the substrate. At this time, preferably, the substrate is preliminarily put on a mold for molding having a desired shape and the substrate put on the mold is immersed in the coagulant solution. Examples of the mold for molding having a desired shape include those described above. After the coagulant solution is applied to the substrate, the solvent contained in the coagulant solution is preferably removed by drying. Although the drying temperature at this time is not particularly limited and may be selected depending on the solvent to be used, the drying temperature is preferably 10 to 80° C., more preferably 15 to 70° C. Although not particularly limited, the drying time is preferably 600 to 1 second, more preferably 300 to 5 seconds.

In the next step, the substrate on which the coagulant solution is deposited is immersed in the latex composition for dip molding while the substrate is put on the mold for molding having a desired shape. Thereby, the latex composition for dip molding is coagulated on the substrate to deposit a polymer layer comprising the latex composition for dip molding on the substrate.

Preferably, after the immersion of the substrate in the latex composition for dip molding, the workpiece is dried. Although not particularly limited, the drying temperature at this time is preferably 10 to 80° C., more preferably 15 to 80° C. Although not particularly limited, the drying time is preferably 120 minutes to 5 seconds, more preferably 60 minutes to 10 seconds.

When a latex composition for dip molding containing a sulfur-based cross-linking agent is used as the latex composition for dip molding, the latex composition for dip molding may be preliminarily aged (also referred to as prevulcanized) before use.

Although not particularly limited, the temperature condition during the aging is preferably 20 to 50° C. The time for aging is preferably 4 hours or more and 120 hours or less, more preferably 24 hours or more and 72 hours or less to prevent peel-off between the substrate and the polymer layer comprising the latex composition for dip molding and to provide a dip-molded body having improved wear resistance when used as a protective glove.

Preferably, in the next step, the polymer components contained in the latex composition for dip molding are cross-linked by heating the latex composition for dip molding deposited on the substrate.

The heating temperature for cross-linking is preferably 60 to 160° C., more preferably 80 to 150° C. Control of the heating temperature within the ranges above can reduce the time needed for the cross-linking reaction to improve the productivity of the dip-molded body, and can suppress oxidative degradation of the polymer components caused by excessive heating to improve the physical properties of the dip-molded body. The heating time for the cross-linking may be appropriately selected according to the heating temperature, and is usually 5 to 120 minutes.

Preferably, water-soluble impurities (such as the emulsifier, the water-soluble polymer, and the coagulant) are removed from the polymer layer in the dip-molded body thus prepared, by immersing the polymer layer formed on the substrate in warn water at 20 to 80° C. for about 0.5 to 60 minutes as needed. Although such a treatment to immerse the polymer layer in warn water may be performed after cross-linking of the polymer components in the polymer layer, it is preferred that the treatment be performed before cross-linking of the polymer components in the polymer layer because water-soluble impurities can be more efficiently removed.

After the immersion in warm water, the polymer layer may be further dried. Although the drying temperature and the drying time at this time are not particularly limited, the drying temperature and the drying time can be the same as those in the drying step after the immersion in the latex composition for dip molding described above.

After the polymer layer is formed on the substrate put on the mold for molding, the product can be taken off (or detached from) the mold for molding to provide a dip-molded body. The method for taking off to be used includes a method of peeling the product from the mold for molding by hands, or a method of peeling the product by hydraulic pressure or pressure of compressed air.

Before or after taking the dip-molded body off the mold for molding, a heat treatment (post cross-linking step) may be further performed at a temperature of 60 to 130° C. for 10 to 120 minutes. After taking the dip-molded body off the mold for molding, a surface-treated layer may be formed on the inner surface and/or the outer surface of the dip-molded body by a surface treatment such as chlorination or coating.

Because in the dip-molded body according to the present invention thus prepared, the polymer layer comprising the above-mentioned latex composition according to the present invention is formed on the substrate by coagulation using the coagulant, the thickness of the polymer layer is preferably 0.05 to 1.0 mm, more preferably 0.06 to 0.8 mm, still more preferably 0.07 to 0.7 mm. Such a configuration can enhance the wear resistance of the resulting dip-molded body. While usually a relatively large thickness of the polymer layer tends to reduce the oil grip properties, the dip-molded body according to the present invention can provide excellent oil grip properties even with a relatively large thickness thereof.

The dip-molded body according to the present invention may further include an additional polymer layer in addition to the substrate and the polymer layer comprising the latex composition according to the present invention. In other words, the dip-molded body according to the present invention may be a dip-molded body including two- or more polymer layers on the substrate. Although not particularly limited, such an additional polymer layer is preferably a polymer layer formed using a latex composition other than the latex composition according to the present invention. Examples of such a latex composition include latex compositions containing a latex of a nitrile group-containing conjugated diene polymer, those containing a latex of styrene-butadiene rubber (SBR), those containing a latex of synthetic polyisoprene rubber (IR), and the like. Among these, preferred are latex compositions containing a latex of a nitrile group-containing conjugated diene polymer because these can provide excellent oil permeation resistance of the resulting dip-molded body. As the latex of a nitrile group-containing conjugated diene polymer, a latex of the nitrile group-containing conjugated diene polymer as one example of the above-mentioned latex of the conjugated diene polymer (A) can be suitably used. Preferably, the polymer layer comprising the latex composition according to the present invention corresponds to the outermost layer because the resulting dip-molded body can have further enhanced oil grip properties.

When two or more layers are included, the polymer layers each can have any thickness. Preferably, the total thickness of all the polymer layers falls within the ranges of a preferred thickness of the polymer layer comprising the latex composition according to the present invention described above, for example.

In an embodiment where two or more polymer layers are included, examples of the production method include, but should not be limited to, a method of applying the coagulant solution to the substrate, immersing the obtained substrate in a latex composition for forming an additional polymer layer at any timing, appropriately performing drying and washing to form the additional polymer layer, and then forming a polymer layer comprising the latex composition according to the present invention according to the above method, and the like.

The dip-molded body according to the present invention has excellent oil grip properties, and can be suitably used, for example, in application to gloves, particularly protective gloves. In the above description, a case where the dip-molded body according to the present invention is a laminate comprising the substrate and the polymer layer comprising the latex composition for dip molding has been illustrated. As described above, the present invention is not limited by such an embodiment, and the dip-molded body according to the present invention can be a membrane molded body comprising the latex composition for dip molding, the membrane molded body being prepared by immersing a mold for dip molding in the latex composition for dip molding.

EXAMPLES

Hereinafter, the present invention will be described in detail by way of Examples, but these Examples should not be construed as limitations to the present invention. Hereinafter, the term "parks" is weight-based unless otherwise specified. A variety of physical properties were measured as follows.

<Volume Average Particle Size>

The volume average particle size of particles of each polymer constituting a latex of the polymer was measured using a light scattering diffraction particle analyzer (available from Beckman Coulter, Inc., trade name "LS-230").

<Solids Concentration of Latex Composition for Dip Molding>

2 g of a sample (weight: X2) was precisely weighed and placed into an aluminum dish (weight: X1), and was dried in a hot air dryer at 105° C. for 2 hours. In the next step, after the sample was cooled in a desiccator, the weight of the sample with the aluminum dish (weight: X3) was measured, and the solids concentration was calculated from the calculation expression:

$$\text{solids concentration (\% by weight)}=(X3-X1)\times 100/X2$$

<Tetrahydrofuran-Insoluble Fraction>

Latices of polymers (polymers (A-1) and (B-1) to (B-5)) were applied onto substrates by casting, and were dried at 25° C. for 120 hours to prepare dried films. The weight (W1 (kg)) of each of the dried films was measured. In the next step, the dried films were immersed in tetrahydrofuran under a condition at 25° C. for 24 hours, and the films after the immersion were dried at 105° C. for 3 hours to remove tetrahydrofuran. For each of the films after the removal of tetrahydrofuran, the weight (W2 (kg)) was measured, and the tetrahydrofuran-insoluble fraction was determined from the following expression:

$$\text{tetrahydrofuran-insoluble fraction (unit: \% by weight)}=100\times W2 \text{ (kg)}/W1 \text{ (kg)}$$

<Measurement of Chemical Stability>

The latex of the conjugated diene polymer (A) and the latex of the polymer (B) were diluted with distilled water respectively to adjust the solids concentrations to 20% by weight.

Using distilled water, $CaCl_2$ aqueous solutions having the following concentrations were prepared:

0.01% by weight, 0.1% by weight, 0.2% by weight, 0.3% by weight, 0.5% by weight, 0.75% by weight, 1.0% by weight, and 1.2% by weight.

The $CaCl_2$ aqueous solutions having the above concentrations were placed onto dishes in an amount of 6 to 7 g each, and 0.03 to 0.04 g of each latex diluted to 20% by weight was added dropwise thereto. After the addition, the dishes were left to stand for 1 minute, and were lightly shaken for mixing. After the mixing, the state of formation of aggregates was visually determined. The highest $CaCl_2$ concentration of the $CaCl_2$ aqueous solution when formation of aggregates was not observed was defined as the chemical stability of the polymer latex. Thus, the chemical stability (CS(A)) of the latex of the conjugated diene polymer (A) and the chemical stability (CS(B)) of the latex of the polymer (B) were determined. The difference (CS(B)−CS(A)) in chemical stability was calculated by subtracting the chemical stability (CS(A)) of the latex of the conjugated diene polymer (A) from the chemical stability (CS(B)) of the latex of the polymer a.

<Oil Grip Properties>

Metal molds having different weights in increments of 0.5 kg from 0.5 kg to 15.0 kg were prepared. Three workers put on protective gloves (dip-molded bodies), and sequentially lifted up these dry metal molds in ascending order in weight to determine the maximum weight (W3 (kg)) of the metal mold lifted by each of the three workers. Next, a test oil IRM903 was applied to these metal molds. The three workers put on the protective gloves (dip-molded bodies), and sequentially lifted up the metal molds including the test oil IRM903 applied thereto in ascending order in weight to determine the maximum weight (W4 (kg)) of the metal mold lifted by each of the three workers. The points of the three persons calculated from the following expression were arithmetically averaged to calculate the average point. Based on the average point, the oil grip properties were evaluated. A higher point indicates a larger maximum weight of the metal mold lifted, and thus higher oil grip properties.

$$(\text{Point})=100\times W3 \text{ (kg)}/W4 \text{ (kg)}$$

Example 1

(Preparation of Aqueous Dispersion of Colloidal Sulfur)

1.0 Part of colloidal sulfur (available from Hosoi Chemical Industry Co., Ltd.), 0.5 parts of a dispersant (available from Kao Corporation, trade name "Demol N"), 0.0015 parts of a 5% by weight potassium hydroxide aqueous solution (available from Wako Pure Chemical Industries, Ltd.), and 1.0 part of water were stirred and ground in a ball mill for 48 hours to prepare an aqueous dispersion of colloidal sulfur (solids concentration: 50% by weight).

(Preparation of Aqueous Dispersion of Zinc Dibutyldithiocarbamate, Aqueous Dispersion of Zinc Oxide, and Aqueous Dispersion of Titanium Oxide)

An aqueous dispersion of zinc dibutyldithiocarbamate (solids concentration: 50% by weight), an aqueous dispersion of zinc oxide (solids concentration: 50% by weight), and an aqueous dispersion of titanium oxide (solids concentration: 50% by weight) were prepared in the same manner as above except that instead of colloidal sulfur, zinc dibutyldithiocarbamate (available from Ouchi Shinko Chemical Industrial Co., Ltd.), zinc oxide (available from Seido Chemical Industry Co., Ltd.), and titanium oxide were used.

(Preparation of Latex of Nitrile Group-Containing Conjugated Diene Polymer (A-1))

66 Parts of 1,3-butadiene as a conjugated diene monomer, 30 parts of acrylonitrile as an $\alpha,\beta$-ethylenically unsaturated nitrile monomer, 4 pars of methacrylic acid as an ethylenically unsaturated monocarboxylic acid monomer, 1 part of t-dodecylmercaptan, 200 parts of deionized water, 3 parts of sodium dodecylbenzenesulfonate, 1 part of a sodium salt of a condensation product of $\beta$-naphthalene sulfonic acid and formalin, 0.1 parts of potassium persulfate, and 0.1 parts of sodium ethylenediaminetetraacetate were charged into a polymerization reactor, and were polymerized while the polymerization temperature was being kept at 30 to 40° C. These were reacted until the polymerization conversion ratio reached 95%. Thus, a latex of a copolymer was prepared.

Thereafter, unreacted monomers were removed from the resulting latex of a copolymer, and the pH and solids concentration of the latex of a copolymer were adjusted to prepare a latex of a nitrile group-containing conjugated diene polymer (A-1) having a solids concentration of 45% by weight, a pH of 8.5, and a CS(A) of 0.1% by weight. The nitrile group-containing conjugated diene polymer (A-1) contained in the resulting latex of the nitrile group-containing conjugated diene polymer (A-1) was measured for the glass transition temperature (Tg), which was −24° C. Particles of the nitrile group-containing conjugated diene polymer (A-1) constituting the latex of the nitrile group-containing conjugated diene polymer (A-1) had a volume average particle size of 126 nm, and the monomer composition in the nitrile group-containing conjugated diene polymer (A-1) was in a proportion substantially identical to that when the monomers were charged.

(Preparation of Latex of Polymethyl Methacrylate Resin (B-1))

100 Parts of methyl methacrylate, 6 parts of a benzenesulfonic acid ester of a 1,1'-oxybistetrapropylene derivative, 0.1 parts of t-dodecylmercaptan, 200 parts of deionized water, 1.5 parts of potassium persulfate, and 0.1 parts of sodium ethylenediaminetetraacetate were charged into a polymerization reactor, and were polymerized while the polymerization temperature was being kept at 30 to 70° C. These were reacted until the polymerization conversion ratio reached 95%. Thus, a latex of a polymer was prepared.

The pH and solids concentration of the latex of a polymer were adjusted to prepare a latex of a polymethyl methacrylate resin (B-1) having a solids concentration of 30% by weight, a pH of 8.5, and a CS(B) of 1.0% by weight. The polymethyl methacrylate resin (B-1) contained in the resulting latex of the polymethyl methacrylate resin (B-1) was measured for the glass transition temperature (Tg), which was 123° C. Particles of the polymethyl methacrylate resin (B-1) constituting the latex of the polymethyl methacrylate resin (B-1) had a volume average particle size of 77 nm.

(Preparation of Latex Composition for Dip Molding)

The latex of the nitrile group-containing conjugated diene polymer (A-1) and the latex of the polymethyl methacrylate resin (B-1) prepared above were mixed in a weight ratio of "nitrile group-containing conjugated diene polymer (A-1): polymethyl methacrylate resin (B-1)" of 7:3, and 5% by weight of potassium hydroxide was added to prepare a latex composition having a solids concentration of 46% by weight and a pH of 8.9.

Each of the aqueous dispersions of the compounding agents prepared above was added in an amount such that the contents of solids were 1.0 part of colloidal sulfur, 1.0 part of zinc dibutyldithiocarbamate, 1.5 parts of zinc oxide, and 3.0 parts of titanium oxide relative to 100 parts of the polymer components in the above resulting latex composition. During the addition of each of the aqueous dispersions of the compounding agents, a predetermined amount thereof was slowly added while the latex composition was being stirred. After these compounding agents were homogenously mixed, 1.2 parts of carboxymethyl cellulose (available from Daicel Corporation, trade name "Daicel 2200", weight average molecular weight: 550,000, acid content: 3.7 mmol/g) as a water-soluble polymer was added, and the solids concentration of the latex was adjusted. Thus, a latex composition (I) for dip molding having a solids concentration of 44% by weight, a viscosity at 25° C. of 3,000 mPa·s, and a difference (CS(B)−CS(A)) of 0.9 was prepared.

(Preparation of Latex Composition (II) for Dip Molding)

Each of the aqueous dispersions of the compounding agents prepared above was added in an amount such that contents of solids were 1.0 part of colloidal sulfur, 1.0 part of zinc dibutyldithiocarbamate, 1.5 parts of zinc oxide, and 3.0 parts of titanium oxide relative to 100 parts of the polymer components in the latex of the nitrile group-containing conjugated diene polymer (A-1). During the addition of each of the aqueous dispersions of the compounding agents, a predetermined amount thereof was slowly added while the latex composition was being stirred. After these compounding agents were homogenously mixed, 0.3 parts of carboxymethyl cellulose (available from Daicel Corporation, trade name "Daicel 2200", weight average molecular weight: 550,000, acid content: 3.7 mmol/g) as a water-soluble polymer was added, and the solids concentration of the latex was adjusted. Thus, a latex composition (II) for dip molding having a solids concentration of 43% by weight and a viscosity at 25° C. of 3,000 mPa·s was prepared.

(Preparation of Coagulant Solution)

Calcium nitrate as a coagulant was dissolved in methanol in a proportion of 3.0% by weight to prepare a coagulant solution.

(Production of Protective Glove (Dip-Molded Body) Including Single Polymer Layer)

Initially, the latex composition (I) for dip molding prepared above was aged (also referred to as prevulcanized) at a temperature of 30° C. for 48 hours. In the next step, a ceramic glove mold on which a glove-shaped fibrous substrate (material: nylon, linear density: 300 denier, gauge No.: 13 gauge, thickness: 0.8 mm) was put was immersed in the coagulant solution prepared above for 5 seconds, and was pulled out of the coagulant solution, followed by drying at a temperature of 30° C. for 1 minute. Subsequently, the resulting ceramic glove mold was immersed in the latex composition (I) for dip molding for 5 seconds, and was pulled out of the latex composition (I) for dip molding, followed by drying at a temperature of 30° C. for 30 minutes. In the next step, the resulting ceramic glove mold was heated at a temperature of 70° C. for 10 minutes to cause cross-linking. Thus, a polymer layer having a thickness of 0.6 mm was famed on the fibrous substrate. Subsequently, the ceramic glove mold on which the polymer layer was famed was dried at a temperature of 30° C. for 10 minutes, and was further subjected to a heat treatment at a temperature of 125° C. for 30 minutes to cross-link the polymers in the polymer layer. In the next step, the fibrous substrate on which the polymer layer was formed was taken off the ceramic glove mold to obtain a protective glove (dip-molded body) including a single polymer layer. The resulting protective glove (dip-molded body) was measured for the oil grip properties according to the method described above. The result is shown in Table 1.

(Production of Protective Glove (Dip-Molded Body) Including Two Polymer Layers)

Initially, the latex composition (II) for dip molding prepared above was aged (also referred to as prevulcanized) at a temperature of 30° C. for 48 hours. In the next step, a ceramic glove mold on which a glove-shaped fibrous substrate (material: nylon, linear density: 300 denier, gauge No.: 13 gauge, thickness: 0.8 mm) was put was immersed in the coagulant solution prepared above for 5 seconds, and was pulled out of the coagulant solution, followed by drying at a temperature of 30° C. for 1 minute. Subsequently, the resulting ceramic glove mold was immersed in the latex composition (II) for dip molding for 5 seconds, and then was pulled out of the latex composition (II) for dip molding, followed by drying at a temperature of 30° C. for 30 minutes to form a dip layer (first dip layer) on the fibrous substrate, the dip layer containing the nitrile group-containing conjugated diene polymer. The ceramic glove mold on which the first dip layer was formed was then dried at a temperature of 70° C. for 20 minutes.

The latex composition (I) for dip molding prepared above was aged (also referred to as prevulcanized) at a temperature of 30° C. for 48 hours. In the next step, the ceramic glove mold on which the first dip layer was famed was immersed in the latex composition (I) for dip molding for 5 seconds, and then was pulled out of the latex composition (I) for dip molding, followed by drying at a temperature of 30° C. for 30 minutes to form a dip layer (second dip layer) on the first dip layer, the second dip layer containing the nitrile group-containing conjugated diene polymer (A-1) and the polymethyl methacrylate resin (B-1).

Subsequently, the ceramic glove mold on which the first dip layer and the second dip layer were formed was dried at a temperature of 30° C. for 10 minutes, and was further subjected to a heat treatment at a temperature of 125° C. for 30 minutes to cross-link the polymers in the first dip layer and the second dip layer. Thus, a first polymer layer and a second polymer layer were formed. In the next step, the fibrous substrate on which the first polymer layer and the second polymer layer were formed was taken off the ceramic glove mold to obtain a protective glove (dip-molded body) including two polymer layers, the first polymer layer having a thickness of 0.13 mm, the second polymer layer having a thickness of 0.03 mm, and the total thickness of the first polymer layer and the second polymer layer being 0.16 mm.

The resulting protective glove (dip-molded body) including two polymer layers was evaluated for the oil grip properties. The result is shown in Table 1.

Example 2

A latex composition (III) for dip molding was prepared as in Example 1 except that the solids concentration of the latex composition for dip molding was changed to 38% by weight. A protective glove (dip-molded body) including a single polymer layer and a protective glove (dip-molded body) including two polymer layers were prepared as in Example 1, and were evaluated as in Example 1. The results are shown in Table 1.

Example 3

A latex composition (IV) for dip molding was prepared as in Example 1 except that the latex of the nitrile group-containing conjugated diene polymer (A-1) and the latex of the polymethyl methacrylate resin (B-1) were mixed in a weight ratio of "nitrile group-containing conjugated diene polymer (A-1):polymethyl methacrylate resin (B-1)" of 5:5 and the solids concentration was 35% by weight. A protective glove (dip-molded body) including a single polymer layer and a protective glove (dip-molded body) including two polymer layers were prepared as in Example 1, and were evaluated as in Example 1. The results are shown in Table 1.

Example 4

(Preparation of Latex of Polymethyl Methacrylate Resin (B-2))

100 Parts of methyl methacrylate, 6 parts of a benzenesulfonic acid ester of a 1,1'-oxybistetrapropylene derivative, 0.1 parts of t-dodecylmercaptan, 200 parts of deionized water, 0.3 parts of potassium persulfate, and 0.1 parts of sodium ethylenediaminetetraacetate were charged into a polymerization reactor, and were polymerized while the polymerization temperature was being kept at 30 to 70° C. These were reacted until the polymerization conversion ratio reached 95%. Thus, a latex of a polymer was prepared.

The pH and solids concentration of the latex of a polymer were adjusted to prepare a latex of a polymethyl methacrylate resin (B-2) having a solids concentration of 30% by weight, a pH of 8.5, and a CS(B) of 0.5. The polymethyl methacrylate resin (B-2) contained in the resulting latex of the polymethyl methacrylate resin (B-2) was measured for the glass transition temperature (Tg), which was 123° C. Particles of the polymethyl methacrylate resin (B-2) constituting the latex of the polymethyl methacrylate resin (B-2) had a volume average particle size of 106 nm.

A latex composition (V) for dip molding having a difference (CS(B)−CS(A)) of 0.4 was prepared as in Example 1 except that the latex of the polymethyl methacrylate resin (B-1) was replaced by the latex of the polymethyl methacrylate resin (B-2), and further the solids concentration of the latex composition for dip molding was changed to 38% by weight. A protective glove (dip-molded body) including a single polymer layer and a protective glove (dip-molded body) including two polymer layers were prepared as in Example 1, and were evaluated as in Example 1. The results are shown in Table 1.

Example 5

(Preparation of Latex of Methyl Methacrylate-Styrene Copolymer Resin (B-3))

40 Parts of methyl methacrylate, 60 parts of styrene, 6 parts of a benzenesulfonic acid ester of a 1,1'-oxybistetrapropylene derivative, 0.1 parts of t-dodecylmercaptan, 200 parts of deionized water, 1.5 parts of potassium persulfate, and 0.1 parts of sodium ethylenediaminetetraacetate were charged into a polymerization reactor, and were polymerized while the polymerization temperature was being kept at 30 to 70° C. These were reacted until the polymerization conversion ratio reached 90%. Thus, a latex of a polymer was prepared.

Thereafter, unreacted monomers were removed from the resulting latex of a polymer, and the pH and solids concentration of the latex of a polymer were adjusted to prepare a latex of a methyl methacrylate-styrene copolymer resin (B-3) having a solids concentration of 30% by weight and a pH of 8.5. The methyl methacrylate-styrene copolymer resin (B-3) contained in the resulting latex of the methyl methacrylate-styrene copolymer resin (B-3) was measured for the glass transition temperature (Tg), which was 104° C. Particles of the methyl methacrylate-styrene copolymer resin (B-3) constituting the latex of the methyl methacrylate-styrene copolymer resin (B-3) had a volume average particle size of 75 nm.

A latex composition (VI) for dip molding having a difference (CS(B)–CS(A)) of 0.1 was prepared as in Example 1 except that the latex of the polymethyl methacrylate resin (B-1) was replaced by the latex of the methyl methacrylate-styrene copolymer resin (B-3) and the solids concentration of the latex composition for dip molding was changed to 39% by weight. A protective glove (dip-molded body) including a single polymer layer and a protective glove (dip-molded body) including two polymer layers were prepared as in Example 1, and were evaluated as in Example 1. The results are shown in Table 1.

Comparative Example 1

A latex composition (VII) for dip molding having a difference (CS(B)–CS(A)) of 0 was prepared as in Example 1 except that the latex of the polymethyl methacrylate resin (B-1) was replaced by a latex of polyvinyl chloride (B-4) (trade name "VINYBLAN 985", available from Nissin Chemical Industry Co., Ltd., glass transition temperature (Tg) of polyvinyl chloride (B-4): 80° C., volume average particle size of particles of polyvinyl chloride (B-4): 84 nm, CS(B)=0.1, polyvinyl chloride (B-4) does not substantially contain a plasticizer) and that the solids concentration of the latex composition for dip molding was 42% by weight. A protective glove (dip-molded body) including a single polymer layer and a protective glove (dip-molded body) including two polymer layers were prepared as in Example 1, and were evaluated as in Example 1. The results are shown in Table 1.

Comparative Example 2

(Preparation of Latex of Polystyrene Resin (B-5))

100 Pats of styrene, 6 parts of a benzenesulfonic acid ester of a 1,1'-oxybistetrapropylene derivative, 0.1 pats of t-dodecylmercaptan, 200 parts of deionized water, 1.5 parts of potassium persulfate, and 0.1 pats of sodium ethylenediaminetetraacetate were charged into a polymerization reactor, and were polymerized while the polymerization temperature was being kept at 30 to 70° C. These were reacted until the polymerization conversion ratio reached 90%. Thus, a latex of a polymer was prepared.

Thereafter, the pH and solids concentration of the latex of a polymer were adjusted to prepare a latex of a polystyrene resin (B-5) having a solids concentration of 30% by weight, a pH of 8.5, and a CS(B) of 0.01% by weight. The polystyrene resin (B-5) contained in the latex of the polystyrene resin (B-5) was measured for the glass transition temperature (Tg), which was 92° C. Particles of the polystyrene resin (B-5) constituting the latex of the polystyrene resin (B-5) had a volume average particle size of 74 nm.

A latex composition (VIII) for dip molding having a difference (CS(B)–CS(A)) of −0.09 was prepared as in Example 1 except that the latex of the polymethyl methacrylate resin (B-1) was replaced by the latex of the polystyrene resin (B-5) and the solids concentration of the latex composition for dip molding was 39% by weight. A protective glove (dip-molded body) including a single polymer layer and a protective glove (dip-molded body) including two polymer layers were prepared as in Example 1, and were evaluated as in Example 1. The results are shown in Table 1.

Table 1

TABLE 1

|  |  | Example |  |  |  |  | Comparative Example |  |
|---|---|---|---|---|---|---|---|---|
|  |  | 1 | 2 | 3 | 4 | 5 | 1 | 2 |
| Latex composition for dip molding |  |  |  |  |  |  |  |  |
| Conjugated diene polymer (A) |  | NBR | NBR | NBR | NBR | NBR | NBR | NBR |
| Particle size of conjugated diene polymer (A) | (nm) | 126 | 126 | 126 | 126 | 126 | 126 | 126 |
| Glass transition temperature of conjugated diene polymer (A) | (° C.) | −24 | −24 | −24 | −24 | −24 | −24 | −24 |
| Tetrahydrofuran-insoluable traction of polymer (A) | (wt %) | 55 | 55 | 55 | 55 | 55 | 55 | 55 |
| Polymer (B) used |  | (B-1) | (B-1) | (B-1) | (B-2) | (B-3) | (B-4) | (B-5) |
| Polymer (B) |  | Polymethyl methacrylate | Polymethyl methacrylate | Polymethyl methacrylate | Polymethyl methacrylate | Methyl methacrylate-styrene copolymer | Polyvinyl chloride | Polystyrene |
| Particle size of polymer (B) | (nm) | 77 | 77 | 77 | 106 | 75 | 84 | 74 |
| Glass transition temperature of polymer (B) | (° C.) | 123 | 123 | 123 | 123 | 104 | 80 | 92 |
| Tetrahydrofuran-insoluable fraction of polymer (B) | (wt %) | 33 | 33 | 33 | 33 | 15 | 3 | 2 |
| Particle size of latex for dip molding | (nm) | 111 | 111 | 102 | 120 | 110 | 113 | 110 |
| Solids concentration of latex composition for dip molding | (wt %) | 44 | 38 | 35 | 38 | 39 | 42 | 39 |
| Weight ratio of content of conjugated diene polymer (A) to that of polymer (B) in latex composition for dip molding | (A:B) | 7:3 | 7:3 | 5:5 | 7:3 | 7:3 | 7:3 | 7:3 |
| Chemical stability (CS(A)) of latex of conjugated diene polymer (A) | (wt %) | 0.1 | 0.1 | 0.1 | 0.1 | 0.1 | 0.1 | 0.1 |
| Chemical stability (CS(B)) of latex of polymer (B) | (wt %) | 1.0 | 1.0 | 1.0 | 0.5 | 0.2 | 0.1 | 0.01 |
| Difference (CS(B) − CS(A)) in chemical stability | (wt %) | 0.9 | 0.9 | 0.9 | 0.4 | 0.1 | 0.0 | −0.09 |

TABLE 1-continued

|  |  | Example | | | | | Comparative Example | |
| --- | --- | --- | --- | --- | --- | --- | --- | --- |
|  |  | 1 | 2 | 3 | 4 | 5 | 1 | 2 |
|  |  | Evaluations | | | | | | |
| Oil grip properties of protective glove including single polymer layer | (Points) | 45 | 50 | 55 | 40 | 35 | 20 | 25 |
| Oil grip properties of protective glove including two polymer layers | (Points) | 35 | 35 | 45 | 25 | 30 | 10 | 25 |

Table 1 shows that when the latex compositions each comprised the latex of the conjugated diene polymer (A) having a glass transition temperature of 10° C. or less and the latex of the polymer (B) having a glass transition temperature of more than 10° C. and the difference (CS(B)–CS(A)) between the chemical stability (CS(A)) of the latex of the conjugated diene polymer (A) to $CaCl_2$ and the chemical stability (CS(B)) of the latex of the polymer (B) to $CaCl_2$ was more than 0% by weight, the resulting dip-molded bodies had excellent oil grip properties irrespective of whether a single layer or two layers were included therein (Examples 1 to 5).

In contrast, when the difference (CS(B)–CS(A)) in chemical stability was 0 or less, the resulting dip-molded bodies had reduced oil grip properties (Comparative Examples 1 and 2).

The invention claimed is:

1. A latex composition comprising a latex of a conjugated diene polymer (A) having a glass transition temperature of 10° C. or less and a latex of a polymer (B) having a glass transition temperature of more than 10° C.,
    wherein the conjugated diene polymer (A) is a nitrile group-containing conjugated diene polymer,
    the polymer (B) is a homopolymer of acrylic acid ester, methacrylic acid ester, acrylic acid, or methacrylic acid,
    the conjugated diene polymer (A) and the polymer (B) are contained in a weight ratio of conjugated diene polymer (A):polymer (B) of 20:80 to 80:20, and
    the value of (CS(B)–CS(A)) is more than 0% by weight, where a chemical stability of the latex of the conjugated diene polymer (A) to $CaCl_2$, when the solids concentration of the latex is 20% by weight, is defined as CS(A) (% by weight), and
    a chemical stability of the latex of the polymer (B) to $CaCl_2$, when the solids concentration of the latex is 20% by weight, is defined as CS(B) (% by weight).

2. The latex composition according to claim 1, wherein polymer particles contained in the latex composition have a volume average particle size of 250 nm or less.

3. The latex composition according to claim 2, wherein the polymer particles have a volume average particle size of 200 nm or less.

4. The latex composition according to claim 1, wherein particles of the polymer (B) contained in the latex of the polymer (B) have a volume average particle size smaller than that of particles of the conjugated diene polymer (A) contained in the latex of the conjugated diene polymer (A).

5. The latex composition according to claim 1, wherein the particles of the polymer (B) contained in the latex of the polymer (B) have a volume average particle size of 200 nm or less.

6. The latex composition according to claim 5, wherein the particles of the polymer (B) contained in the latex of the polymer (B) have a volume average particle size of 100 nm or less.

7. The latex composition according to claim 1, wherein the latex composition has a solids concentration of 30% by weight or more.

8. The latex composition according to claim 1, wherein the polymer (B) has a polymer chain terminated with a sulfate group as a residue of a polymerization initiator.

9. The latex composition according to claim 1, wherein the conjugated diene polymer (A) is a carboxyl group-containing conjugated diene polymer.

10. A dip-molded body formed by dip molding the latex composition according to claim 1.

11. The dip-molded body according to claim 10, wherein the dip-molded body is a glove.

\* \* \* \* \*